(12) United States Patent
Ozkan

(10) Patent No.: US 10,515,473 B2
(45) Date of Patent: Dec. 24, 2019

(54) METHOD AND APPARATUS FOR GENERATING ACTIONABLE MARKED OBJECTS IN IMAGES

(71) Applicant: AT&T Intellectual Property I, L.P., Atlanta, GA (US)

(72) Inventor: Mehmet Ozkan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 162 days.

(21) Appl. No.: 15/830,687

(22) Filed: Dec. 4, 2017

(65) Prior Publication Data

US 2019/0172235 A1 Jun. 6, 2019

(51) Int. Cl.
| | | |
|---|---|---|
| *G06T 11/60* | (2006.01) | |
| *G06F 3/16* | (2006.01) | |
| *G06F 3/0484* | (2013.01) | |
| *G06T 7/70* | (2017.01) | |

(52) U.S. Cl.
CPC .......... *G06T 11/60* (2013.01); *G06F 3/04842* (2013.01); *G06F 3/167* (2013.01); *G06T 7/70* (2017.01)

(58) Field of Classification Search
CPC ...... G06F 3/04842; G06F 3/167; G06T 11/60; G06T 7/70
See application file for complete search history.

(56) References Cited

U.S. PATENT DOCUMENTS

| | | | |
|---|---|---|---|
| 7,249,367 B2 | 7/2007 | Bove, Jr. et al. | |
| 7,620,914 B2 | 11/2009 | Li et al. | |
| 9,516,251 B2 * | 12/2016 | Welch | H04N 5/44513 |
| 9,560,415 B2 * | 1/2017 | Good | H04N 21/4725 |
| 9,560,416 B2 | 1/2017 | Caidar et al. | |
| 9,588,663 B2 | 3/2017 | Haroon et al. | |
| 2003/0098869 A1 | 5/2003 | Arnold et al. | |
| 2008/0209480 A1 * | 8/2008 | Eide | G11B 27/105 |
| | | | 725/87 |
| 2009/0271269 A1 | 10/2009 | Lieb et al. | |
| 2012/0167145 A1 | 6/2012 | Incorvia et al. | |
| 2012/0198496 A1 | 8/2012 | Yuan et al. | |
| 2016/0307604 A1 | 10/2016 | Hirajoh | |

* cited by examiner

*Primary Examiner* — Manuchehr Rahmjoo
(74) *Attorney, Agent, or Firm* — Guntin & Gust, PLC; Atanu Das

(57) ABSTRACT

Aspects of the subject disclosure may include, for example, embodiments for generating an embedded object definitions (EOD) file for an image of a video file. The EOD file can include information about object markings of the video image. Further embodiments include identifying an object within the original video and determining a plurality of pixels associated with the object. A position, a color, a contrast and a brightness are associated with each of the plurality of pixels. Additional embodiments include adjusting color, contrast, and brightness of each of the plurality of pixels resulting in adjusted pixels of each of the plurality of pixels. Also, embodiments can include overlaying the marked image with the adjusted pixels of each of the plurality of pixels during a presentation of the video file. The marked image presents the object as marked on a display to a user, resulting in a marked object. Other embodiments are disclosed.

20 Claims, 11 Drawing Sheets

105

200

300

METHOD AND APPARATUS FOR GENERATING ACTIONABLE MARKED OBJECTS IN IMAGES

FIELD OF THE DISCLOSURE

The subject disclosure relates to method and apparatus for generating actionable marked objects in images.

BACKGROUND

Current state of the art allows for providing information for people (e.g. actors, director, writer, etc.) within or associated with media content in a video file. Such information can be accessed through remote control device using an electronic programming guide (EPG) that controls presentation of the media content. That is, while viewing a presentation of the media content, a user can actuate an "information" button on the remote control. After which, the EPG can then present information on the people within or associated with the media content.

BRIEF DESCRIPTION OF THE DRAWINGS

Reference will now be made to the accompanying drawings, which are not necessarily drawn to scale, and wherein.

DETAILED DESCRIPTION

Figure 1A:
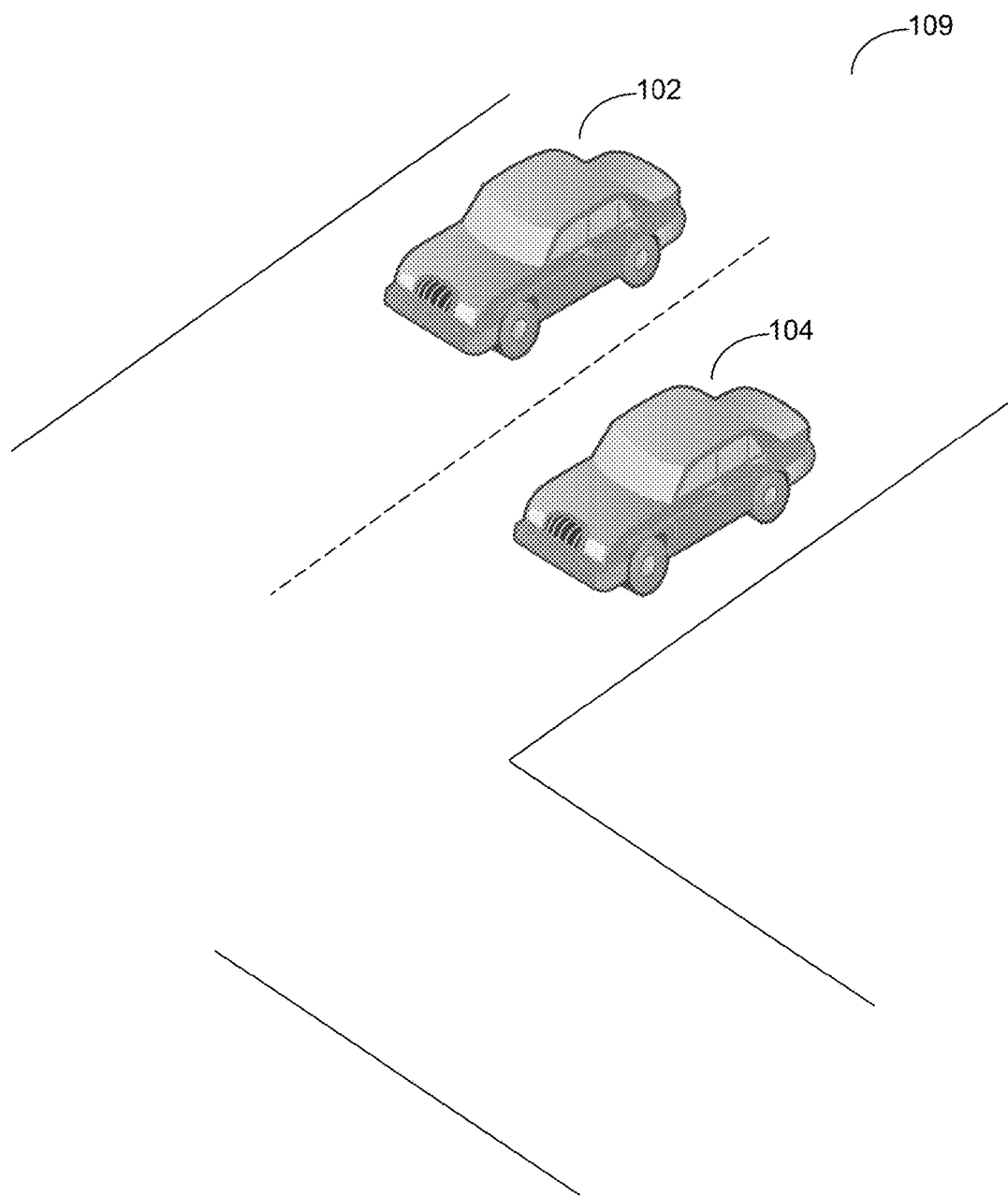
FIGS. 1A-1E depicts an illustrative embodiment of a system for generating actionable marked objects within images.

The subject disclosure describes, among other things, illustrative embodiments for generating an embedded object definitions (EOD) file associated with an image of a video file. The EOD file can include information about the marked image. Further embodiments include identifying an object within the marked image and determining a plurality of pixels associated with the object. A position, a color, a contrast and a brightness are associated with each of the plurality of pixels. Additional embodiments can include adjusting the color, the contrast, and the brightness of each of the plurality of pixels resulting in adjusted pixels of each of the plurality of pixels. Also, embodiments can include overlaying the marked image with the adjusted pixels of each of the plurality of pixels during a presentation of the video file. The marked image presents the object as marked or highlighted on a display to a user, resulting in a marked object. Other embodiments are described in the subject disclosure.

One or more aspects of the subject disclosure include a device. The device can include a processing system including a processor and a memory that stores executable instructions that, when executed by the processing system, facilitate performance of operations. Operations can include generating an EOD file associated with an image of a video file. The EOD file includes information about the marked image, resulting in a marked image. Further operations can include identifying an object within the marked image and determining a plurality of pixels associated with the object. A position, a color, a contrast and a brightness are associated with each of the plurality of pixels. Additional operations can include adjusting the color, the contrast, and the brightness of each of the plurality of pixels resulting in adjusted pixels of each of the plurality of pixels and overlaying the marked image with the adjusted pixels of each of the plurality of pixels during a presentation of the video file. The marked image presents the object as marked on a display to a user, resulting in a marked object.

One or more aspects of the subject disclosure include a machine-readable storage medium, comprising executable instructions that, when executed by a processing system including a processor, facilitate performance of operations. The operations can include receiving user-generated input. The user-generated input can include selected pixels on a marked image. Further operations can include determining that one or more of the selected pixels include a portion of adjusted pixels of the marked image within an EOD file. Additional operations can include identifying a marked object associated with the adjusted pixels. Also, operations can include identifying an action associated with the marked object in an assigned object actions (AOA) file.

One or more aspects of the subject disclosure include a method. Further, the method can include obtaining, by a processing system including a processor, an image of an object. In addition, the method can include generating, by the processing system, an EOD file associated with an image of a video file. The EOD file includes information regarding markings of the image resulting in a marked image. Also, the method can include identifying, by the processing system, the object within the marked image by comparing the marked image to the image of the object using image recognition techniques implemented by a software application. Further, the method can include determining, by the processing system, a plurality of pixels associated with the object. A position, a color, a contrast, and a brightness are associated with each of the plurality of pixels. In addition, the method can include adjusting, by the processing system, the color, the contrast, and brightness of each of the plurality of pixels resulting in adjusted pixels of each of the plurality of pixels. Also, the method can include overlaying, by the processing system, the marked image with the adjusted pixels of each of the plurality of pixels during a presentation of the video file, wherein the marked image presents the object as marked on a display to a user, resulting in a marked object.

FIGS. 1A-1E depicts an illustrative embodiment of a system 100 for generating actionable marked objects within images. Referring to FIG. 1A, in one or more embodiments, the system 100 includes an image 109 that can be part of media content within a video file. Further, the image 109 can include objects 102-104. The media content can be presented by a set top box or media processor on a display such as a television or mobile device (smartphone, tablet computer, etc.). The set top box can access the media content from a video server over a communication network. Each object 102-104 can be a luxury item or a consumer product such as a luxury item. A media content provider or the object manufacturer or distributor may associate an action with each object 102-104. Thus, the media content provider or media content distributor can mark or highlight each object in the image to indicate to a viewer of the media content that some action is associated with the marked object. An action can include accessing information regarding the object as well as allowing a viewer to purchase the object. Further, an action can include accessing another portion of the media content within the video file that includes the object 102-104.

Figure 1B:
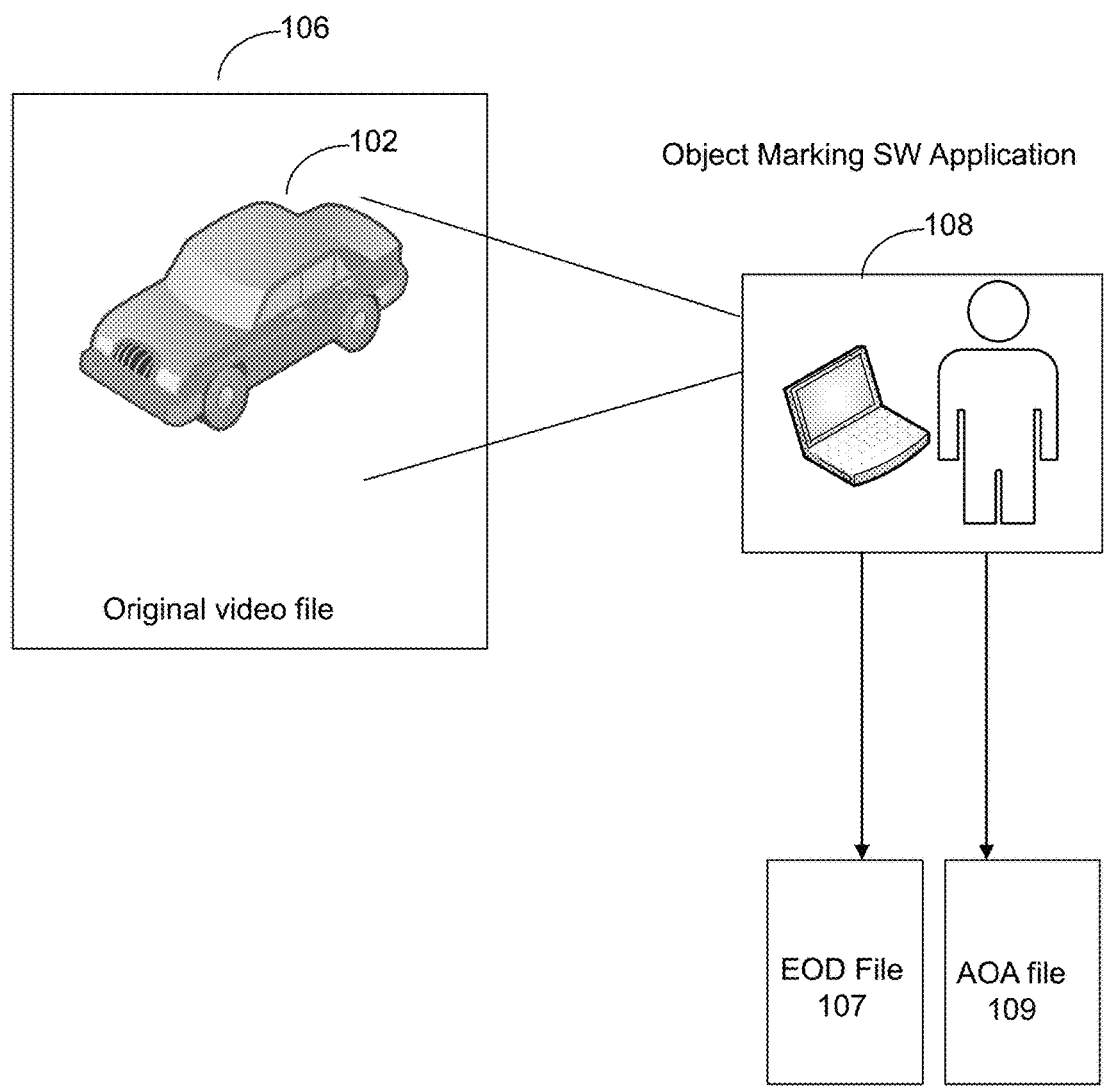

Referring to FIG. 1B, in some embodiments, a file (e.g. a metadata file, image file, or information file) 106 can be part of metadata provided to the entity marking the object. In other embodiments, pixels and/or pixel value associated with the object to be marked are provided with the metadata. In one or more embodiments, the object 102 can be identified and used to mark or highlight the object within images of the media content in the video file using image recognition techniques implemented by a software application on a computing device or manually identified by a user/entity personnel using other software applications 108 which may allow an operator to mark the objects on the screen and collect the pixel locations of the markings, storing them into the EOD file 107, without changing the original media file. Actions associated with marked object can be stored in the AOA file 109.

Figure 1C:
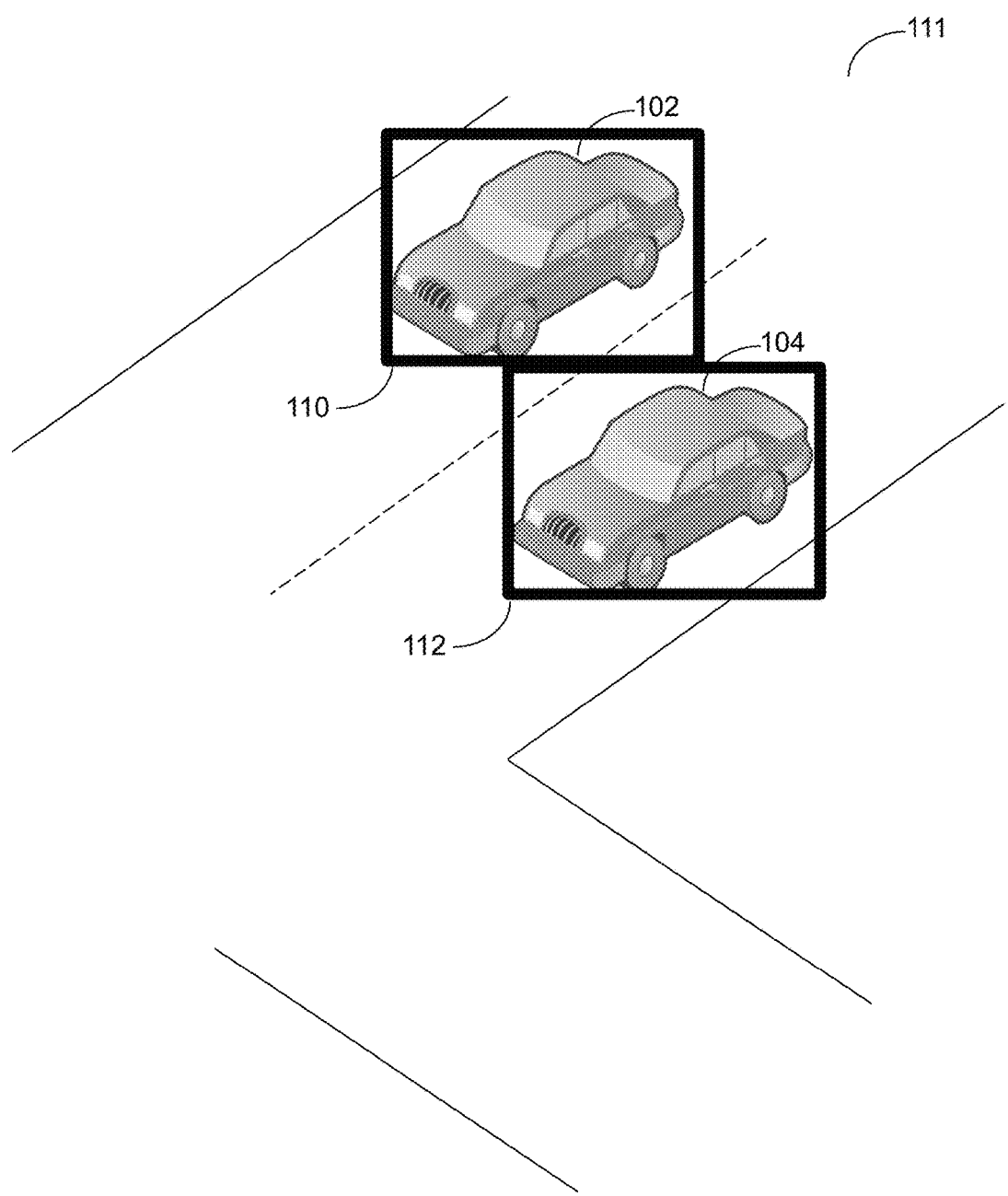

Referring to FIG. 1C, in one or more embodiments, a video server operated by a media content provider or media content distributor can determine the object 102 within an image 111 using image recognition techniques (implemented by a software application) based on the object 102 in the scanned image 106. In other embodiments, pixels associated with the objects 102-104 can be obtained by the media content provider or media content distributor through metadata associated with the image 109 that include the pixels associated with the image of the object 102-104. These pixels can be those that comprise the image of the object 102-104 or can be pixels that surround the image of the object 102-104. Each pixel comprise values of position (along the x-y coordinate of the display), color, contrast, and brightness. The video server can collect the image pixel information 109 to mark the object and stores the information into the EOD file resulting a marked image 111 on the screen. Further, the video server can adjust the value of the color, contrast, and/or brightness of all or a portion of the pixels associated with the object to mark or highlight 110-112 the object 102-104 within the marked image 111. The marked image information 111 can be part of an EOD file. Further, the image marking 111 is overlaid on the image 109 of the original video file when presenting the media content.

In one or more embodiments, the viewer can view the marked image 111 and see the marked objects 102, 104, 110, 112. Further, the marked objects 102, 104, 110, 112 indicates to the viewer that some action (e.g. access information regarding object, purchase object, access another portion of the media content that includes the object, etc.) is associated with the object 102, 104, 110, 112. In further, embodiments, the viewer can provide viewer (i.e. user) generated input indicating a selection of a marked object 102, 104, 110, 112. The user-generated input can be generated using a touchscreen, mouse, television remote control, set top box remote control, voice recognition input device that can comprise a microphone, restore recognition (image sensor recognizing gestures) and any other user input device. In other embodiments, the video player can determine the marked object 102, 104, 110, 112 selected by the user according to the user-generated input. Further, the video player can determine the actions associated with the marked object 102, 104, 110, 112. That is, an assigned object actions (AOA) file is associated with both the video file and the EOD file. After the marked object is selected by the user, the video player determines whether there are actions for the marked object 102, 104, 110, 112. Actions include accessing information (over the Internet) regarding the object or accessing another portion of the media content that includes the marked object 102, 104, 110, 112.

Figure 1D:
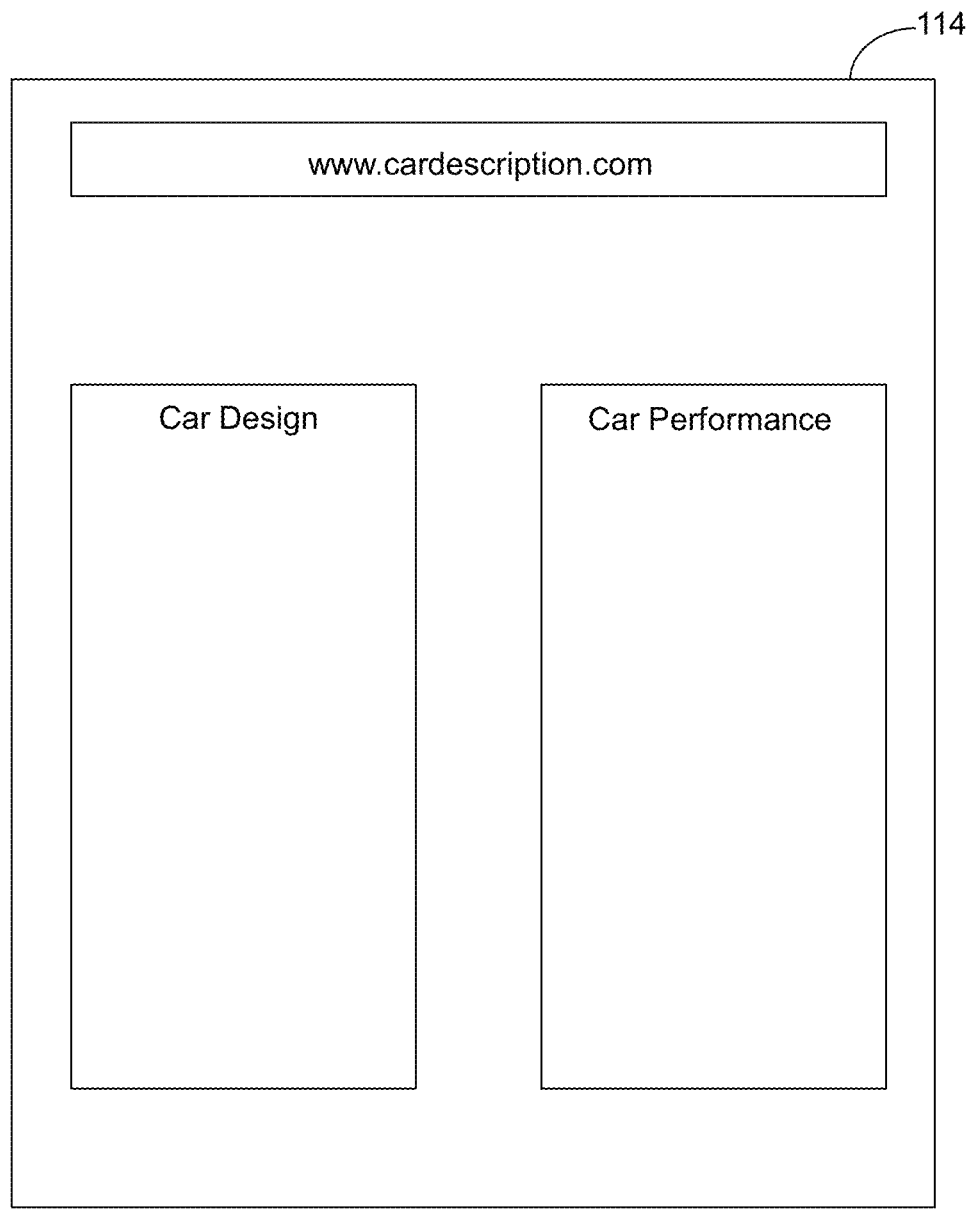

Referring to FIG. 1D, in one or more embodiments, a viewer/user can select a marked object within media content using user-generated input. Further, a video player can receive the user-generated input and determine the selected marked object. Further, the video player can identify one or more actions associated with the selected marked object. One action can be to access a website associated with the marked object. For example, the marked object can be a luxury car. Further, an action associated with the marked object can be accessing a website 114 for the luxury car. The website 114 can provide a description of the luxury car that can include the luxury car design and the luxury car performance.

Figure 1E:
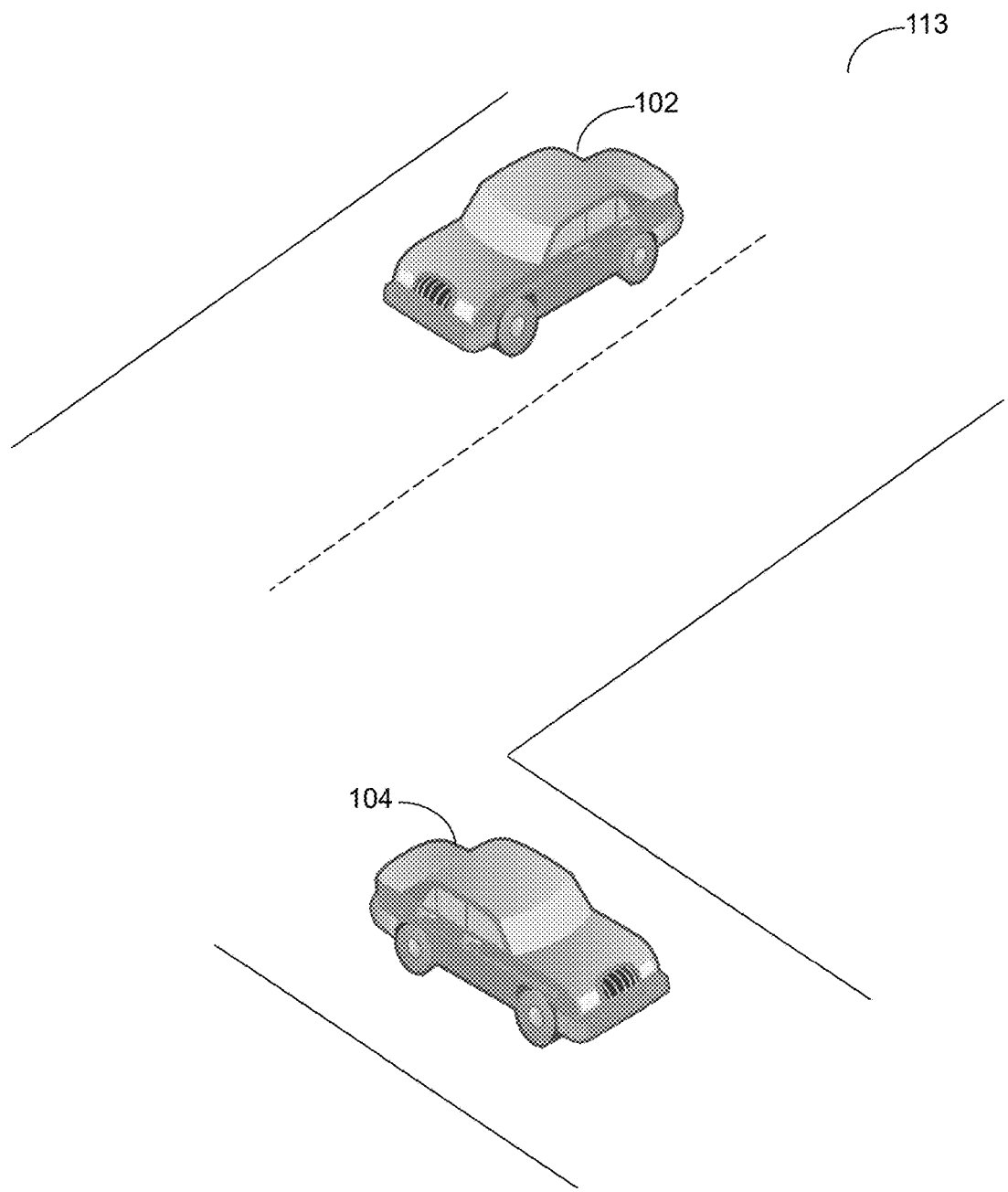

Referring to FIG. 1E, in one or more embodiments, an action associated with a marked object within an image in a first portion of the video file can be accessing a second portion of the video file 113. A viewer/user can select the marked object 104 using the user-generated input. Further, the video server can receive the user-generated input and determine the selected marked object 104 and identify the action of accessing a second portion (image 113) of the video file that includes the marked object 104. For example, the marked object can be a luxury car 104. For example, the marked object 104 can be a luxury car. A user can selected the marked object 104. The image 111 can be part of first portion of the video file that includes a car chase scene that includes the luxury car (marked object 104). Accessing a second portion of the video that includes the luxury car (marked object 104) can be the next scene of the car chase, which includes image 113.

In one or more embodiments, the viewer/user can select the marked object by generating user input through an input device that includes a touchscreen, remote control, voice recognition input device, gesture recognition device, smartphone, or any other user input device. In some embodiments, in which the user-generated input includes voice data, the voice data can include a name of the marked object in image 111. Further, the video server can determine the selected marked object according to the name of the marked object within the voice data according to voice recognition techniques implemented by a software application.

In one or more embodiments, a user interface can present a list of marked objects within an image 111 and a viewer/user can select a marked object from the list marked objects to execute an action associated with the selected marked object. When prompted by the user through a user input device, the video player can access the EOD file to determine the marked objects associated with the image currently displayed to the viewer/user according to the time instance of the image containing the marked objects. The user interface is provided the marked objects and lists the marked objects in the display for the viewer/user. In further embodiments, after a marked object is associated, the user interface can present a list of associated actions for the marked objects, which can be selected by the user accordingly. The EOD file includes an object identifier with each marked object. The actions associated with each marked object can be determined from the AOA file according to the object identifier. When prompted by the user through a user input device, the video server can access the AOA file to determine the actions associated with the marked objects within the image currently displayed to the viewer/user according to the action name or action identifier and/or the object identifier. The user interface is provided the associated actions and lists the actions in the display for the viewer/user, which can be selected by the user accordingly.

In one or more embodiments, the pixels of an object can be describes by the following:

$$O_i = \sum_{y=y1}^{Yn} \sum_{x=x1}^{Xn} P_i(X_i, Y_i, C_i, CN_i, Br_i, T_{t0}) \qquad (1)$$

wherein $O_i$ is the object identified to be marked within the image of media content in a video file, $T_{t0}$ represents the relative time value (from the beginning of the video) that the object marking begins or remains valid, Y represents a column of pixels, y1 is the lowest Y coordinate of any pixel representing the object, Yn is the highest Y coordinate of any pixel representing the object $Y_i$ represents each individual pixel between y1 and Yn, X represents a row of pixels, x1 is the lowest X coordinate of any pixel representing the object, Xn is the highest X coordinate of any pixel representing the object X, represents each individual pixel between x1 and Xn, $C_i$ represents the color of an individual pixel, $CN_i$ represents the contrast of an individual pixel, and $Br_i$ represents the brightness of an individual pixel. The values for each pixel can be recorded for each marked object in a file or database using the sequential time series records. For example, 32=P(878, 214, c4ff33, 3, 5, 233) represents a pixel value for Object 32 in the $233^{rd}$ second of the video (i.e. the time value 233 represents the time elapsed from the beginning of the video of the original media content) for a pixel located at (878, 214) x-y coordinates. Such a pixel can be formatted with color c4ff33, contrast level 3, and brightness level 5. When a group of pixels associated with the object are adjusted, then the object is presented as marked to the user. Such pixel values are provided for each time instance/interval for images in the video file. Thus, the EOD file can have a list of adjusted pixel values for each object to be marked within images of the media content in the video file.

In one or more embodiments, the EOD file includes data regarding the marked objects in the form of a database of pixels (and their associated attribute values) defining the objects or object marking area (i.e. boundaries of the marked objects). This may contain an entire object area in case the whole object is to be highlighted on the display screen or the borders of the object area on the display screen using a highlight color (e.g. green or yellow).

In one or more embodiments, the markings are made in the form of a screen overlay, without touching or otherwise editing the original media content. Thus, a shaded area on the screen can be created or generated using the screen overlay and may not need to copy the entire image into the EOD file. The screen overlay can be a virtual screen represented by a coordinate system that uses the same resolution (i.e. the same number of pixels on the x and y axis), representing the video scene pixels of the original media content. The screen overlay is displayed (overlapped) on the video of the original media content to display the marked objects.

In one or more embodiments, a pixel representation A(x, y, t) represents pixel A located at (x, y) coordinate point of the screen, t seconds after the start of video in the original media content. Each object marking (represented by a set of pixels is recorded with a time reference from the beginning of the video (i.e. a time series database) such that the video player software application can synchronize the EOD file and the video being played from the beginning. This way when a user input is received, the video player software application pauses the video, looks up the EOD file and checks if there is an object making at that moment on the screen. If so, it highlights the object(s) (i.e. the set of pixels on the screen overlay) on the screen using the highlighted pixels/area information stored in the EOD file, and displays the available actions for the marked objects and waits to receive user input accordingly.

In one or more embodiments, the object markings can be made manually prior to the video being offered for streaming. In some embodiments, image recognition technology can be employed in marking objects. In using image recognition, instead of manually determining and marking objects, an image recognition engine can analyze the scenes within the video and find identifiable objects and mark them automatically and associates relevant action to the marked objects.

In one or more embodiments, instead of marking objects beforehand, the object recognition can be made in real-time during video playback. In such embodiments, when user input is received, a screen capture is taken and sent to an image recognition engine that analyzes the image. The image recognition engine finds recognizable objects with in the screen capture and marks/highlights the objects on the screen. Depending on the objects recognized, another software module can determine the relevant actions associated with each object and displays them on the screen.

In one or more embodiments, the AOA file can list actions associated with each object. For example, in the chart below can be for Object 32:

| Object | Action |
|--------|--------|
| 32 | Action1 = "Learn More" https://www.productinfo.com |
| 32 | Action2 = "Call 18005554446666" https://sipserver.co.com/call.asp |
| 32 | Action3 = "Call Me" https://sipserver.co.com/callback.asp |
| 32 | Action4 = "New Scene" Go to Time 1024 |

The first action allows for the user to access product information associated with the object. The second action allows the user to call a customer service representative to purchase the object. The third action allows the customer service representative to call the user using Voice over IP or Video IP conferencing for the user to purchase the object. Other embodiments can include an action to access a website to purchase the object. The fourth action access another portion (starting at the $1024^{th}$ second of the video file) of the media content in the video file.

In one or more embodiments, a list of actions associated with one or more marked objects from the AOA file are displayed. A user, via user input, can select any of the actions, and the actions are performed by the according computing device. The user can provide user input using a remote control device, mouse, touchscreen or voice using speech recognition technology.

Figure 2:
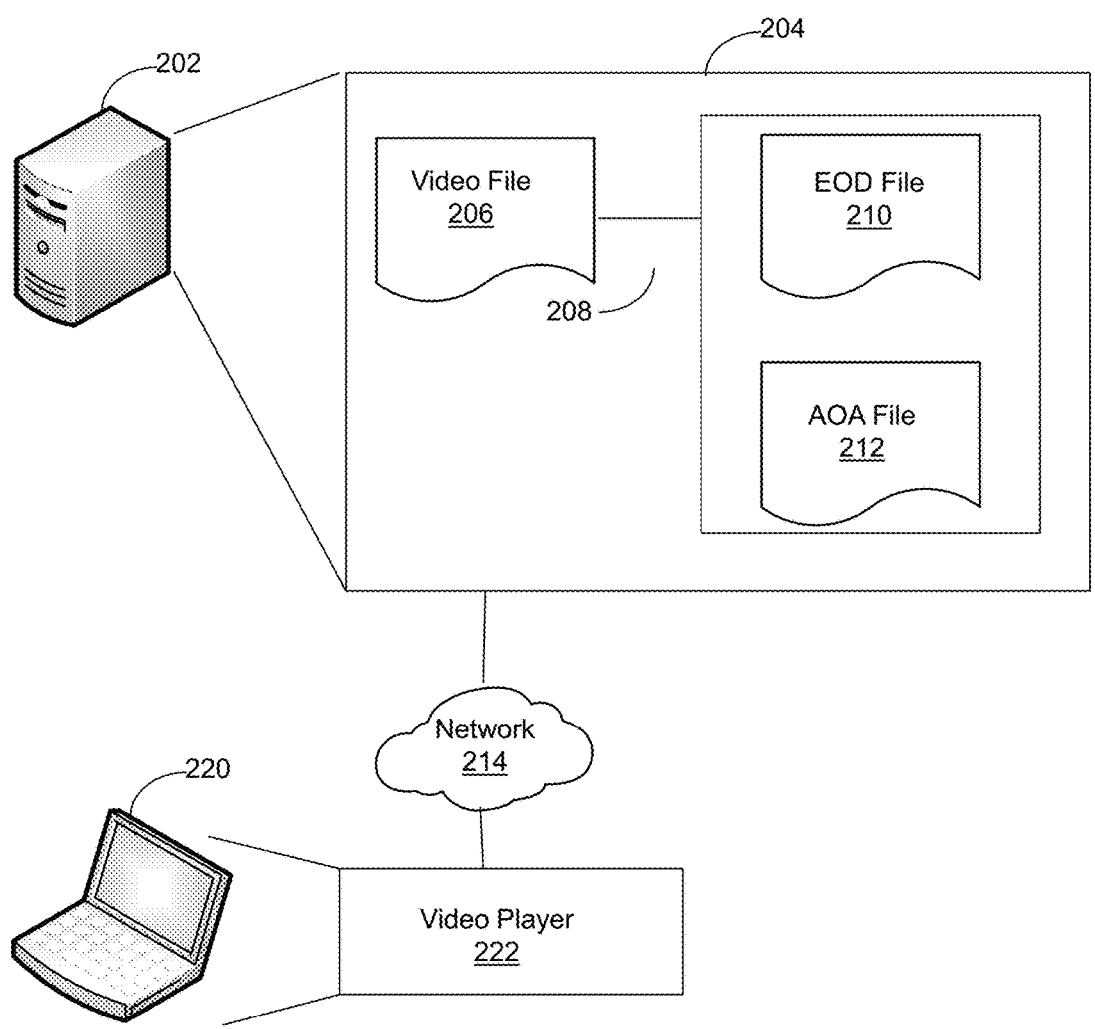
FIG. 2 depicts an illustrative embodiment of another system for generating actionable marked objects in images.

FIG. 2 depicts an illustrative embodiment of another system 200 for generating actionable marked objects in images. In one or more embodiments, the system 200 can include a video server 202 and a user device 220 communicating over a network 214. The video server 202 can implement video server components 204 that include a video file 206, metadata 208 associated with the video file 206, EOD file 210, and AOA file 212. The user device 220 can implement a video player to play the video file and/or EOD file as well as access the AOA file. The user device can include a set top box, media processor, mobile phone, table computer, laptop computer, desktop computer, wearable device, virtual reality device, or augmented reality device. The video player can be a software application (e.g. mobile application) implemented on the user device 220.

In one or more embodiments, the video file 206 can be streamed over the network 214 by the video server 2020 to the user device 220 to be presented by the video player 222. Further, the marked objects within an image of the video file are included in the EOD file and the actions associated with each marked object is includes in the AOA file. The EOD video file 206 can be linked to with the EOD file 210 and AOA file 212 using the metadata 208. If the video server receives user-generated input selecting a marked object within an image in the video file 206 then the video server or player 202 can execute an associated action for the selected marked object.

In one or more embodiments, the EOD file with the marked image having marked objects is synchronized with the video file such that the marked images with marked objects are overlaid in proper time sequence to the images of the video file. In some embodiments, after synchronization, the video file can be played or streamed to a user in conjunction with the EOD file.

In one or more embodiments, after receiving user-generated input indicated a selection of a marked object, an object identifier is determined according to the information in the EOD file. Further, the actions of the marked object are identified from the AOA file according to the object identifier. A list of actions can be presented to the user for selection and an action can be executed in response to receiving a selected action from the user. In some embodiments, an object can have a default action that is executed in response to identifying that such an object has been selected.

Figure 3:
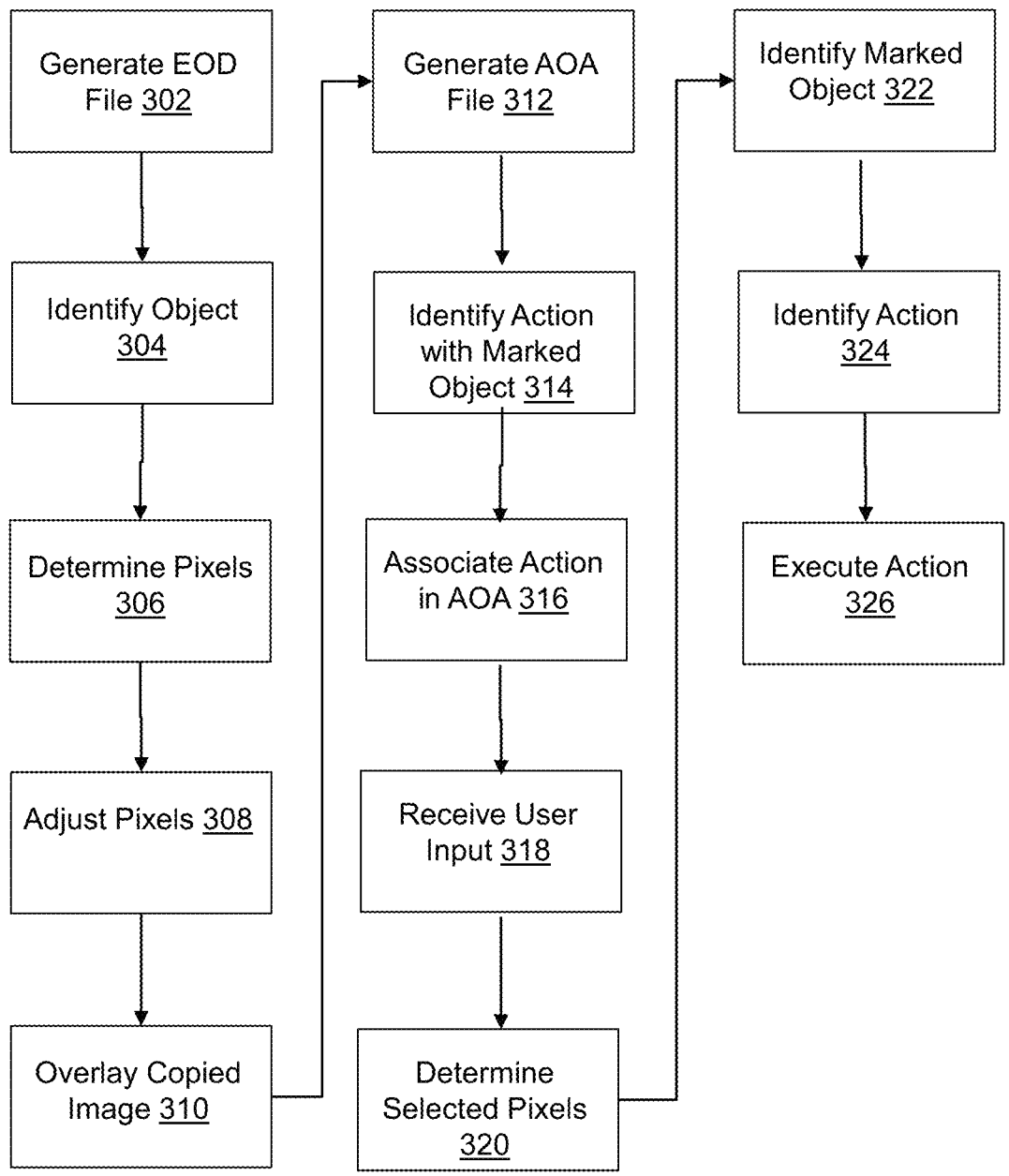
FIG. 3 depicts an illustrative embodiment of a method used in portions of the system described in FIGS. 1A-1E and FIG. 2.

FIG. 3 depicts an illustrative embodiment of a method 300 used in portions of the system described in FIGS. 1A-1E and FIG. 2. In one or more embodiments, the method 300 can be implemented by a computing device that include a video server in a cloud network or a set top box/media processor on a customer premises. The method 300 can include, at 302, the computing device generating an EOD file associated with an image of a video file. The EOD file includes marking information about the image, resulting in a marked image. Further, the method 300 can include, at 304, the computing device identifying an object within the marked image. In some embodiments, the computing device can obtain an image of the object from a media content provider (or some other entity) and the identifying of the object within the marked image can be done by comparing the marked image to the obtained image of the object using image recognition techniques implemented by a software application. In other embodiments, the computing device can obtain metadata that provide the pixels and associated pixel values for the object in the image and corresponding marked image.

The method 300 can include, at 306, the computing device determining a plurality of pixels associated with the object. That includes a position, a color, a contrast and a brightness being associated with each of the plurality of pixels. Also, the method 300 can include, at 308, the computing device adjusting the color, the contrast, and the brightness of each of the plurality of pixels resulting in adjusted pixels of each of the plurality of pixels. Further, the method 300 can include, at 310, the computing device overlaying the marked image with the adjusted pixels of each of the plurality of pixels during a presentation of the video file. The marked image presents the object as marked on a display to a user, resulting in a marked object.

The method 300 can include, at 312, the computing device generating an assigned object actions (AOA) file associated with the marked image. Also, the method 300 can include, at 314, the computing device identifying an action with the marked object. Further, the method can include, at 316, the computing device associating the action with the marked object in the AOA file.

The method can include, at 318, the computing device receiving user-generated input. The user-generated input includes selected pixels of the marked image. The user-generated input can be generated using a touchscreen, mouse, remote control, mobile phone, voice recognition input device (e.g. microphone), gesture recognition (image recognition) input device, or any other user input device. Further, the method 300 can include, at 320, the computing device determining that one or more of the selected pixels include a portion of the adjusted pixels within the EOD file. In addition, the method 300 can include, at 322, the computing device identifying the marked object associated with the adjusted pixels. Also, the method 300 can include, at 324, the computing device identifying the action associated with the marked object in the AOA file. Further, the method 300 can include, at 326, the computing device executing the action associated with the marked object. In some embodiments, the action is access from the AOA file. In other embodiments the action can be accessing a website, implementing a software or mobile application. In further embodiments, the selected marked object can be in an image within a first portion of the video file and the action can be accessing an image in a second portion of the video file.

Portions of embodiments described herein can be combined with portions of other embodiments.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
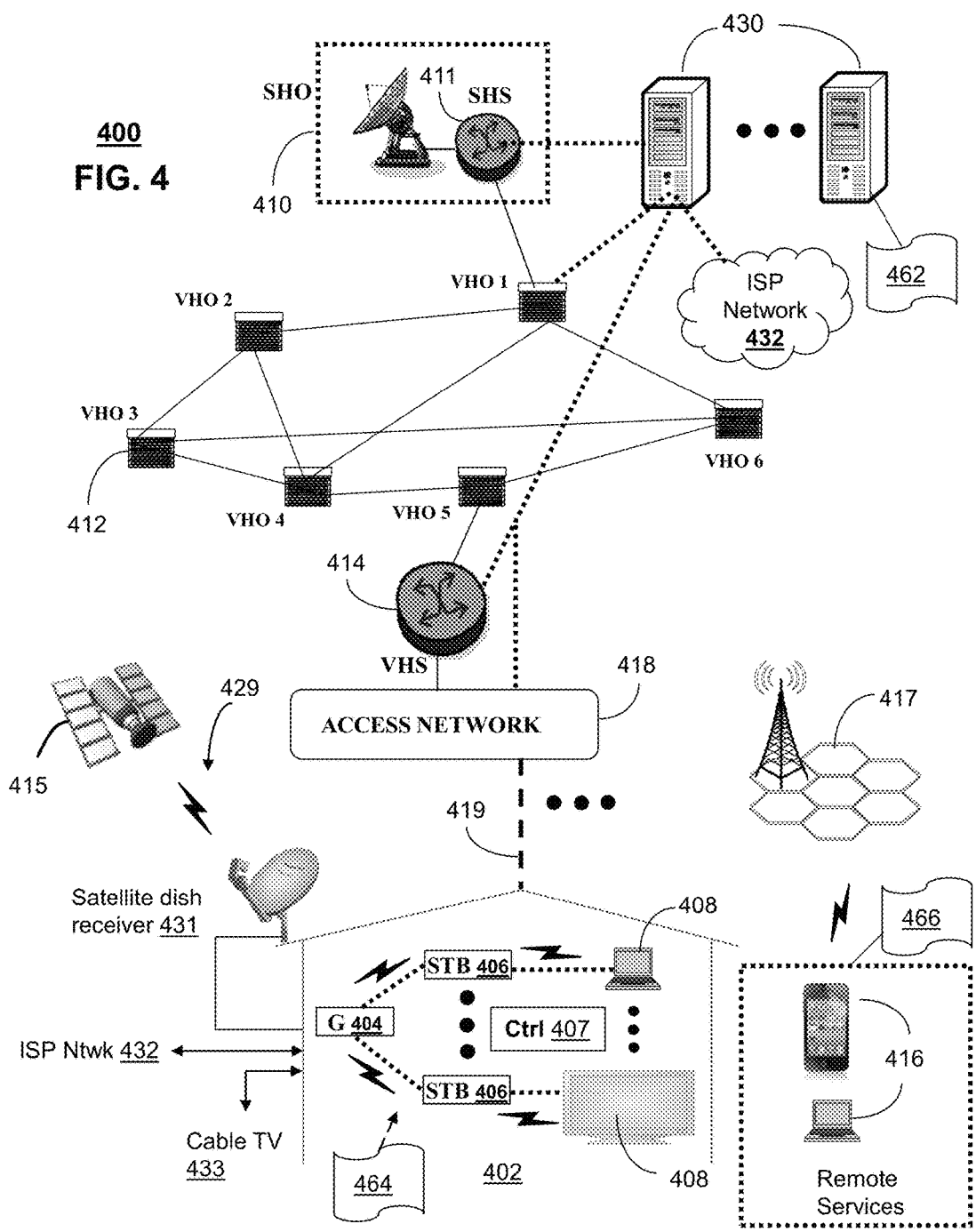
FIGS. 4-5 depict illustrative embodiments of communication systems that provide media services such as generating actionable marked objects within images of media content.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with systems 100, 101, 103, 105, 107, and 200 shown in FIGS. 1A-1E and FIG. 2 as another representative embodiment of communication system 400. For instance, one or more devices illustrated in the communication system 400 of FIG. 4 can include generating an EOD file associated with an image of a video file. The EOD file includes marking information about the image, resulting in a marked image. Further, the device can include identifying an object within the marked image. In addition, the devices can include determining a plurality of pixels associated with the object.

A position, a color, a contrast and a brightness are associated with each of the plurality of pixels. Also, the device can include adjusting the color, the contrast, and the brightness of each of the plurality of pixels resulting in adjusted pixels of each of the plurality of pixels. Further, the devices can include overlaying the marked image with the adjusted pixels of each of the plurality of pixels during a presentation of the video file. The marked image presents the object as marked on a display to a user, resulting in a marked object.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a video server (herein referred to as video server 430). The video server 430 can use computing and communication technology to perform function 462, which can include among other things, the techniques of generating of actionable marked objects within images described by method 300 of FIG. 3. For instance, function 462 of server 430 can be similar to the functions described for server 202 of FIG. 2 in accordance with method 300. The media processors 406 and wireless communication devices 416 can be provisioned with software functions 464 and 466, respectively, to utilize the services of video server 430. For instance, functions 464 and 466 of media processors 406 and wireless communication devices 416 can be similar to the functions described for the communication devices 220 of FIG. 2 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
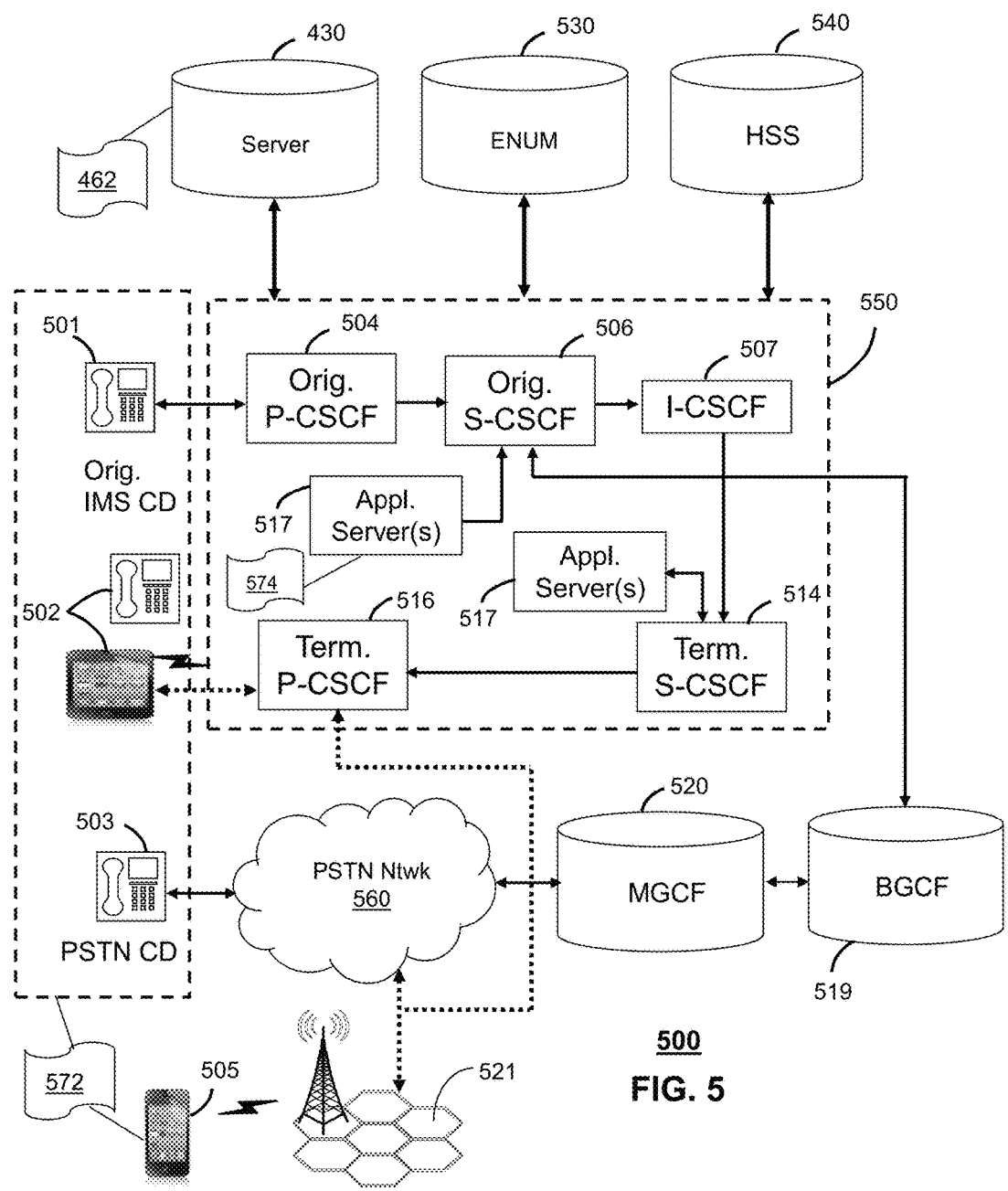

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with systems 100, 101, 103, 105, 200 of FIGS. 1 and/or 2 and communication system 400 as another representative embodiment of communication system 400. The devices of FIG. 5 can include obtaining an image of an object and generating an EOD file associated with an image of a video file. The EOD file includes—object marking information about the image resulting in a marked image. Further, the devices can include identifying the object within the original image by. In addition, the devices can include determining a plurality of pixels associated with the object. A position, a color, a contrast, and a brightness are associated with each of the plurality of pixels. Also, the devices can include adjusting the color, the contrast, and brightness of each of the plurality of pixels resulting in adjusted pixels of each of the plurality of pixels. Further, the devices can include overlaying the image marking with the adjusted pixels of each of the plurality of pixels during a presentation of the video file. The image markings present the object as marked on a display to a user, resulting in a marked object.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The video server 430 of FIG. 4 can be operably coupled to communication system 500 for purposes similar to those described above. Video server 430 can perform function 462X and thereby provide services for generating actionable marked objects within images of media content to the CDs 501, 502, 503 and 505 of FIG. 5 similar to the functions described for server 202 of FIG. 2 in accordance with method 300 of FIG. 3. CDs 501, 502, 503 and 505, which can be adapted with software to perform function 572 to utilize the services of the video server 430<similar to the functions described for communication devices 220 of FIG. 2 in accordance with method 300 of FIG. 3. Video server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
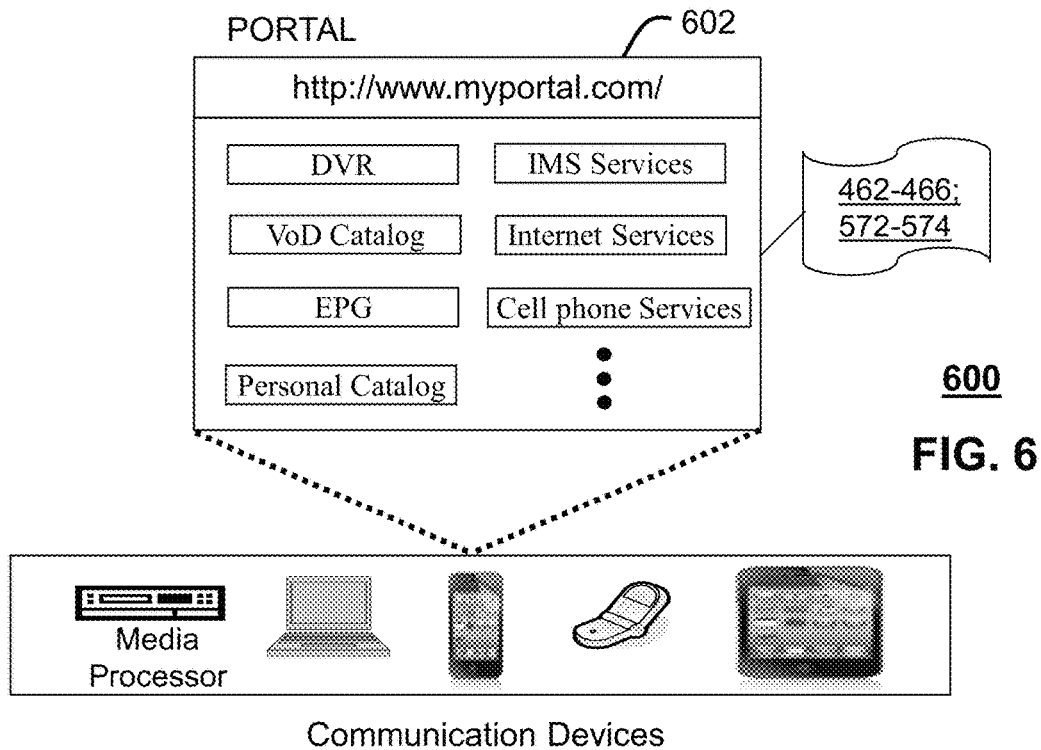
FIG. 6 depicts an illustrative embodiment of a web portal for interacting with the communication systems that generate actionable marked objects within images of media content.

FIG. 6 depicts an illustrative embodiment of a web portal 602 of a communication system 600. Communication system 600 can be overlaid or operably coupled with systems 100, 101, 103, 105, 107, 200 of FIGS. 1A-1E and/or 2], communication system 400, and/or communication system 500 as another representative embodiment of systems 100, 101, 103, 105, 107 200 of FIGS. 1A-1E and 2, communication system 400, and/or communication system 500. The web portal 602 can be used for managing services of systems 100, 101, 103, 105, 107 200 of FIGS. 1A-1E and 2 and communication systems 400-500. A web page of the web portal 602 can be accessed by a Uniform Resource Locator (URL) with an Internet browser using an Internet-capable communication device such as those described in FIGS. 1A-E and/or 2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of systems 100, 101, 103, 105, 107 200 of FIGS. 1A-1E and 2, and communication systems 400-500. For instance, users of the services provided by server 202 or server 430 can log into their on-line accounts and provision the servers 202 or server 430 with functions for generating actionable marked objects within images of media content, and so on. Service providers can log onto an administrator account to provision, monitor and/or maintain the systems 100, 101, 103, 105, 107 200 of FIGS. 1A-1E and 2 or server 430.

Figure 7:
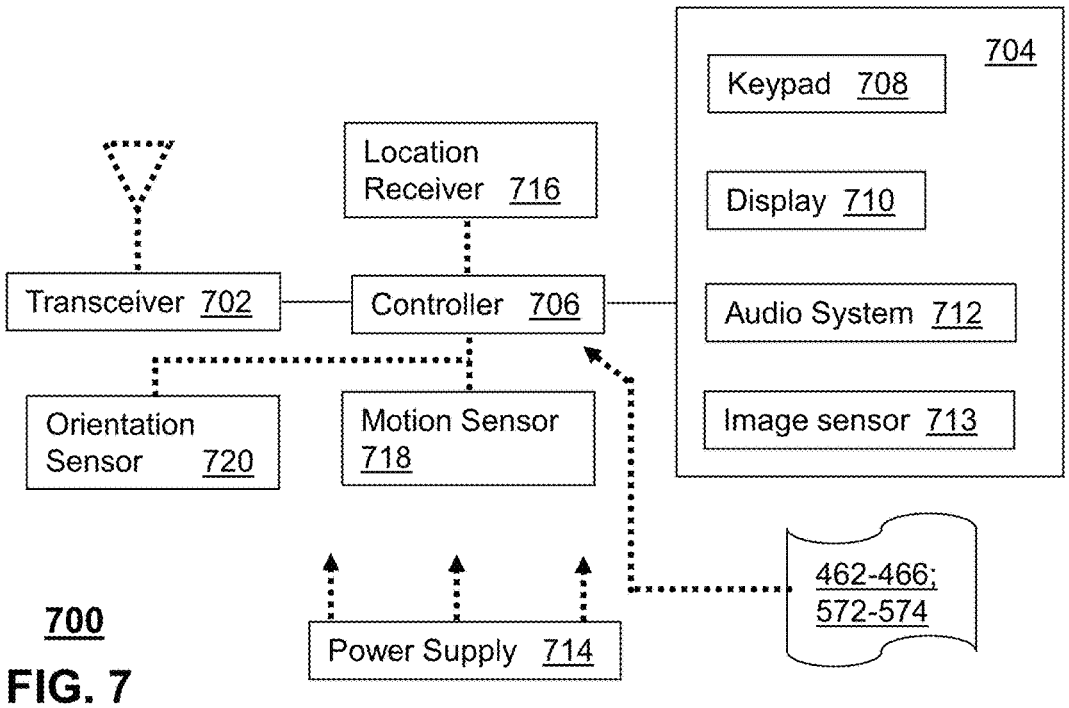
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1A-1E and/or 2, and FIGS. 4-5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/ GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1A-1E and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems 100, 101, 103, 105, 107 200 of FIGS. 1A-1E and 2, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
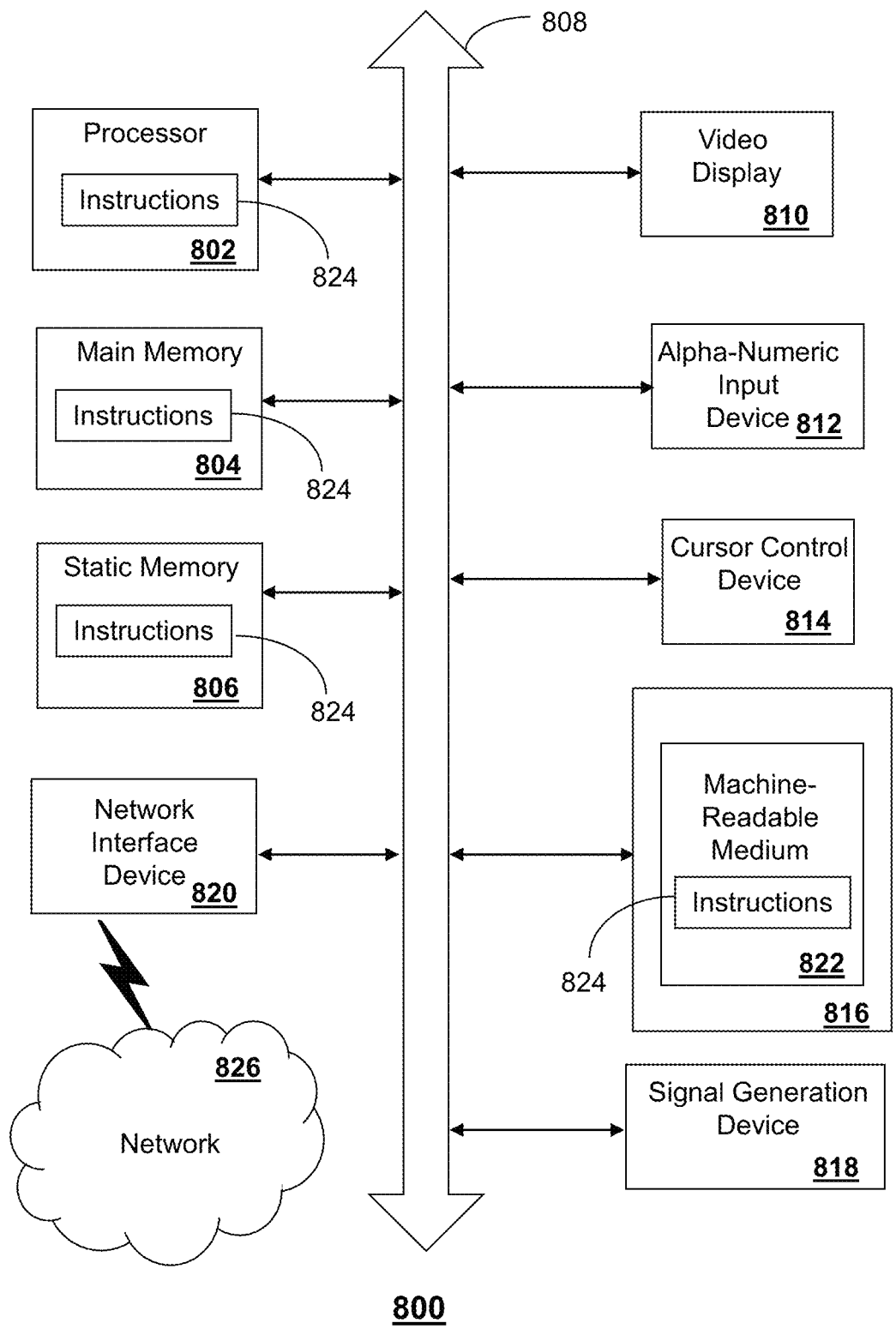
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the video server 430, the media processor 406, video server 202, user device 220 and other devices of FIGS. 1A-1E. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system, facilitate performance of operations, the operations comprising:
   generating an embedded object definitions (EOD) file associated with an image of a video file, wherein the EOD file includes information regarding image markings, resulting in a marked image;
   identifying an object within a video image;
   determining a plurality of pixels associated with the object, wherein a position, a color, a contrast and a brightness are associated with each of the plurality of pixels;
   adjusting the color, the contrast, and the brightness of each of the plurality of pixels resulting in adjusted pixels of each of the plurality of pixels;
   overlaying the marked image with the adjusted pixels of each of the plurality of pixels during a presentation of the video file, wherein the marked image presents the object as marked on a display to a user, resulting in a marked object;
   generating an assigned object actions (AOA) file associated with the image;
   identifying an action with the marked object;
   associating the action with the marked object in the AOA file
   receiving user input, wherein the user input includes a name of the marked object in the marked image;
   determining one or more of selected pixels of the marked image according to the name of the marked object, wherein the selected pixels include a portion of the adjusted pixels within the EOD file;
   identifying the marked object associated with the adjusted pixels; and
   identifying the action associated with the marked object in the AOA file.

2. The device of the claim 1, wherein the generating the EOD file includes receiving object marking information from an object marking software application associating the action with the marked object in the AOA file.

3. The device of the claim 2, wherein the information regarding image markings is based on the object marking information identifying the action associated with the marked object in the AOA file.

4. The device of claim 3, wherein the video image is not changed when marking the object.

5. The device of claim 2, wherein the operations comprise executing the action associated with the marked object.

6. The device of claim 5, wherein the action can be one of accessing a website, initiating communication with a customer representative, and implementing a software application.

7. The device of claim 5, wherein a first portion of the video file includes the image and the action includes accessing a second portion of the video file.

8. The device of claim 1, wherein the EOD file comprises information regarding the object markings of the video file, includes the marked object.

9. The device of claim 1, wherein the identifying the object comprises identifying the object using image recognition techniques implemented by a software application.

10. A non-transitory machine-readable storage medium, comprising executable instructions that, when executed by a processing system including a processor, facilitate performance of operations, the operations comprising:
   generating an embedded object definitions (EOD) file associated with an image, wherein the EOD file includes information regarding object markings within a video file resulting in a marked image;
   identifying an object within a video image of the video file;
   determining a plurality of pixels associated with the object, wherein a position, a color, a contrast, and a brightness are associated with each of the plurality of pixels;
   adjusting the color, the contrast, and the brightness of each of the plurality of pixels resulting in adjusted pixels of each of the plurality of pixels;
   overlaying the marked image with the adjusted pixels of each of the plurality of pixels during a presentation of the video file, wherein the marked image presents the object as marked on a display to a user, resulting in a marked object;
   generating an assigned object actions (AOA) file associated with the image;
   identifying an action with the marked object;
   associating the action with the marked object in the AOA file receiving first user input, wherein the first user input includes a name of the marked object in the marked image;

determining one or more of selected pixels of the marked image according to the name of the marked object, wherein the selected pixels include a portion of the adjusted pixels within the EOD file;

identifying the marked object associated with the adjusted pixels; and identifying the action associated with the marked object in the AOA file.

11. The non-transitory machine-readable storage medium of claim 10, wherein the operations further comprise:

receiving second user input, wherein the second user input includes the selected pixels of the marked image;

determining that one or more of the selected pixels include the portion of adjusted pixels of the marked image within the EOD file;

identifying the marked object associated with the adjusted pixels; and identifying the action associated with the marked object in the AOA file.

12. The non-transitory machine-readable storage medium of claim 11, wherein generating the EOD file includes receiving object marking information from an object marking software application, wherein the information regarding image markings is based on the object marking information, and wherein the video image is not changed when marking the object.

13. The non-transitory machine-readable storage medium of claim 12, wherein the operations further comprise executing the action associated with the marked object.

14. The non-transitory machine-readable storage medium of claim 13, wherein the executing the action comprises accessing a portion of the video file.

15. The non-transitory machine-readable storage medium of claim 11, wherein the operations further comprise:

obtaining an image of the object, wherein identifying the object within the marked image comprises identifying the object within object by comparing the marked image to the image of the object using image recognition techniques implemented by a software application.

16. A method, comprising:

obtaining, by a processing system including a processor, an image of an object; generating, by the processing system, an embedded object definitions (EOD) file associated with an image of a video file, wherein the EOD file includes information regarding a marked object within a video image resulting in a marked image;

identifying, by the processing system, the object within an original video image:

determining, by the processing system, a plurality of pixels associated with the object, wherein a position, a color, a contrast, and a brightness are associated with each of the plurality of pixels;

adjusting, by the processing system, the color, the contrast, and brightness of each of the plurality of pixels resulting in adjusted pixels of each of the plurality of pixels; and overlaying, by the processing system, the marked image with the adjusted pixels of each of the plurality of pixels during a presentation of the video file, wherein the marked image presents the object as marked on a display to a user, resulting in the marked object;

generating, by the processing system, an assigned object actions (AOA) file associated with the image;

identifying, by the processing system, an action with the marked object;

associating, by the processing system, the action with the marked object in AOA file;

receiving user input, wherein the user input includes a name of the marked object in the marked image;

determining, by the processing system, one or more of selected pixels of the marked image according to the name of the marked object, wherein the selected pixels include a portion of the adjusted pixels within the EOD file;

identifying, by the processing system, the marked object associated with the adjusted pixels; and identifying the action associated with the marked object in the AOA file.

17. The method of claim 16, comprising:

wherein the generating the EOD file include receiving object marking information from an object marking software application, wherein the information regarding image markings is based on the object marking information, and wherein the video image is not changed when marking the object.

18. The method of claim 17, comprising:

wherein the information regarding image markings is based on the object marking information, and wherein the video image is not changed when marking the object.

19. The method of claim 17, comprising executing, by the processing system, the action associated with the marked object.

20. The method of claim 19, wherein the executing the action comprises accessing, by the processing system, a portion of the video file.

* * * * *